United States Patent
Metcalfe et al.

(10) Patent No.: US 7,926,139 B2
(45) Date of Patent: Apr. 19, 2011

(54) RAMP INSERT

(75) Inventors: Paul R. Metcalfe, Solon, OH (US); Anil V. Singaraju, Columbus, IN (US); Scott E. Urban, Cleveland, OH (US)

(73) Assignee: Cequent Consumer Products, Solon, OH (US)

( * ) Notice: Subject to any disclaimer, the term of this patent is extended or adjusted under 35 U.S.C. 154(b) by 133 days.

(21) Appl. No.: 12/455,373

(22) Filed: Jun. 1, 2009

(65) Prior Publication Data
US 2010/0037405 A1 Feb. 18, 2010

Related U.S. Application Data

(60) Provisional application No. 61/130,459, filed on May 30, 2008.

(51) Int. Cl.
*E01D 1/00* (2006.01)
(52) U.S. Cl. .................................................. 14/69.5
(58) Field of Classification Search ........... 14/69.5–72.5
See application file for complete search history.

(56) References Cited

U.S. PATENT DOCUMENTS

| | | | | |
|---|---|---|---|---|
| D398,129 S | * | 9/1998 | Sacks et al. | D34/32 |
| 6,811,067 B2 | * | 11/2004 | Muizelaar et al. | 224/404 |
| 7,524,156 B2 | * | 4/2009 | Garbes | 414/537 |
| 2001/0031193 A1 | * | 10/2001 | Chevrier | 414/522 |
| 2006/0177294 A1 | * | 8/2006 | Garbes | 414/537 |

* cited by examiner

*Primary Examiner* — Raymond W Addie
(74) *Attorney, Agent, or Firm* — McDonald Hopkins LLC (57) ABSTRACT

The present invention is directed to a ramp insert for insertion between rails and/or rungs of a ramp. An embodiment of the present invention includes a body that may have an adjustable length. The body may include a first section that may include a track portion and a second section that may include a groove portion. The groove portion may be capable of fitting together with the track portion. The first or second section may be capable of slidably moving with respect to the other section via the track portion and the groove portion. The ramp insert may be placed between the rails and/or rungs of the ramp whereby the ramp insert may be adjusted to various lengths. Since the ramp insert may be adjusted to various lengths, the ramp insert may fit many different kinds of ramps having various widths.

18 Claims, 14 Drawing Sheets

RAMP INSERT

CROSS-REFERENCE TO RELATED APPLICATION

This application claims benefit from U.S. Provisional Patent Application No. 61/130,459, entitled "Ramp Insert," filed on May 30, 2008, which is hereby incorporated in its entirety by reference.

FIELD OF INVENTION

The present invention relates generally to ramps, and more particularly, to an apparatus, such as a ramp insert that may be capable of providing a continuous surface between rungs of a ramp.

BACKGROUND OF THE INVENTION

Numerous types of ramps are often used to assist in the loading and unloading of objects from transportation vehicles. Particularly, trucks, vans, trailers and the like may utilize ramps to assist in the loading of objects such as ATVs, motorcycles, lawnmowers, etc. One common type of ramp may consist of a plurality of rungs whereby each rung is separated from a successive rung by an open space. The rungs are connected at or near the ends by rails. The successive rungs and the rails form a series of frame-like structures surrounding the central openings, similar to a ladder. Such a structure allows for loading and unloading of objects, such as ATVs, motorcycles, lawnmowers and etc., as long as the diameter of the tires of such objects is greater than the gap or distance between the successive rungs. In other words, the tires of the objects to be loaded must be greater in size than the central openings between the successive rungs of the ramp so that the object can be moved along the ramp.

Users frequently load many different types of objects onto the transporting vehicle. For example, a user may desire to use a single ramp to load a motorcycle and an ATV onto the transporting vehicle. However, the ATV and the motorcycle may have different sized tires so that the single ramp is unable to allow a user to effectively load and unload the ATV and the motorcycle. Accordingly, a user must connect a first type of ramp to the transporting vehicle to load the motorcycle, disconnect the first type of ramp, and connect a second type of ramp to the transporting vehicle to load the ATV. In addition, in such an example, the user must transport both types of ramps in order to be able to unload the ATV and the motorcycle.

Even if a single ramp is able to accommodate a few different types of objects to be loaded, the central opening between the rungs often causes difficulty in the loading and unloading of those certain objects. For example, even if the object, such as an ATV, has tires with diameters greater than the length of the central opening of the ramp, the tires may be difficult to move from one central opening to another central opening along the length of the ramp. The user must apply sufficient force to move the object from one central opening of the ramp, over the ramp rung and into the next central opening of the ramp.

Advantageously, the present invention provides an apparatus for insertion between rungs of a ramp to provide a surface for unloading and loading objects. The central opening between the rungs may be partially, substantially or completely filled by the apparatus to ease the loading and unloading of the object for the user.

SUMMARY OF INVENTION

The present invention is directed to a ramp insert for insertion between rails and/or rungs of a ramp. An embodiment of the present invention includes a body that may have an adjustable length. The body may include a first section that may include a track portion and a second section that may include a groove portion. The groove portion may be capable of fitting together with the track portion. The first or second section may be capable of slidably moving with respect to the other section via the track portion and the groove portion. The ramp insert may be placed between the rails and/or rungs of the ramp whereby the ramp insert may be adjusted to various lengths. Since the ramp insert may be adjusted to various lengths, the ramp insert may fit many different kinds of ramps having various widths.

DETAILED DESCRIPTION OF THE INVENTION

While the present invention is described with reference to embodiments described herein, it should be clear that the present invention is not limited to such embodiments. Therefore, the description of the embodiments herein is merely illustrative of the present invention and will not limit the scope of the invention as claimed.

Figure 1:
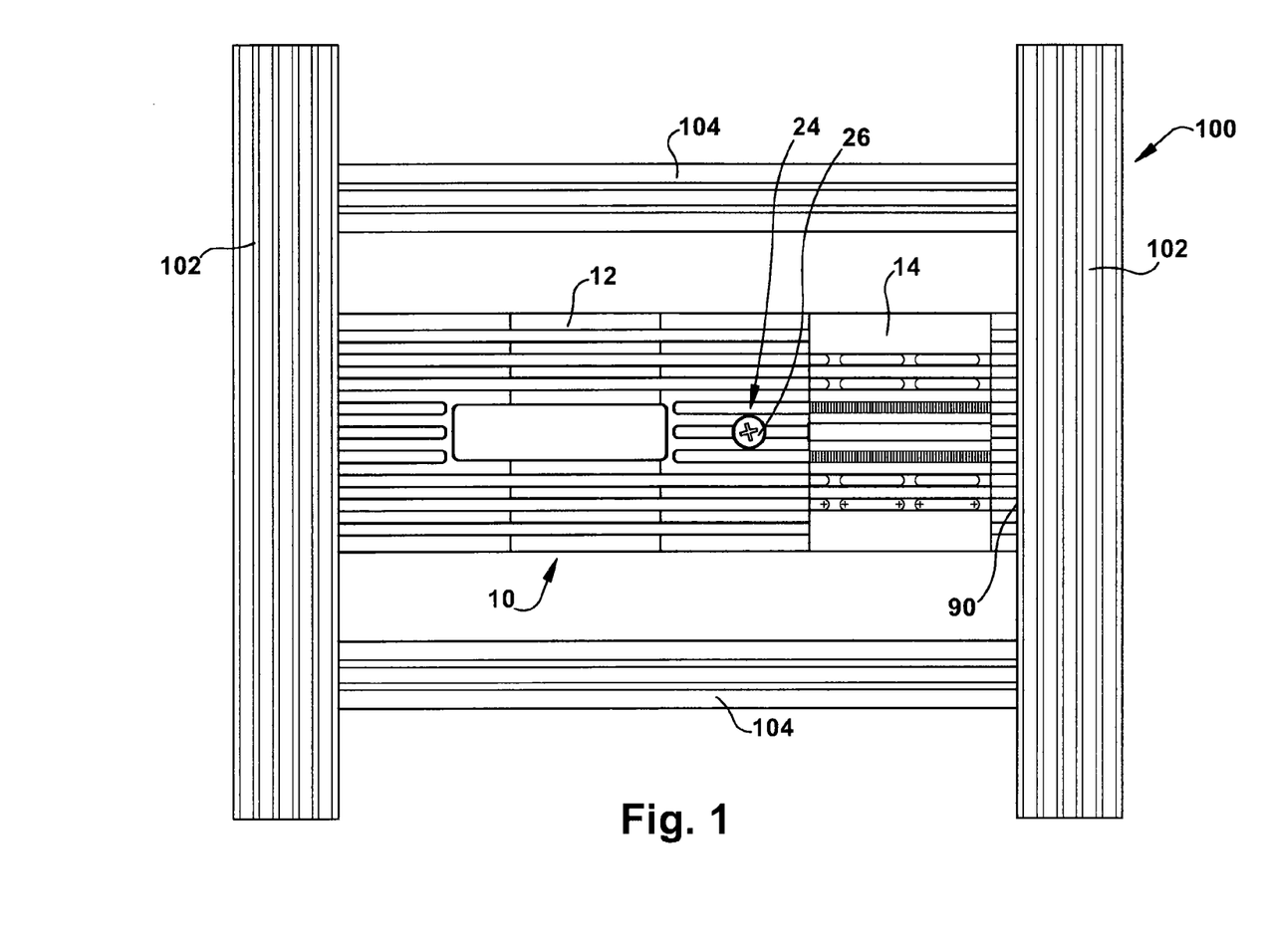
FIG. 1 illustrates a top view of a ramp insert connected to a ramp in an embodiment of the present invention.
Figure 2A:
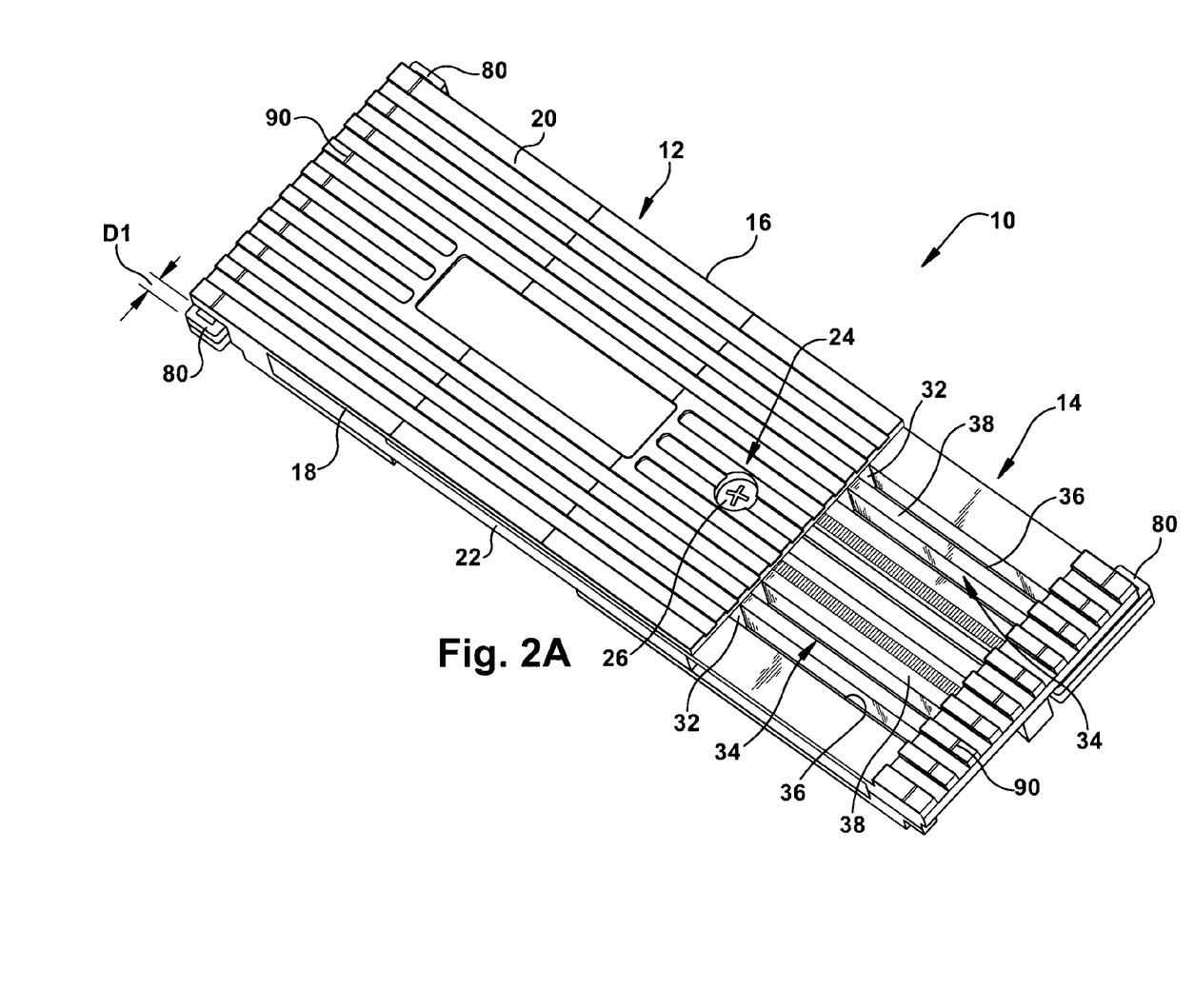
FIG. 2A illustrates an isometric view of a ramp insert in an embodiment of the present invention.
Figure 2B:
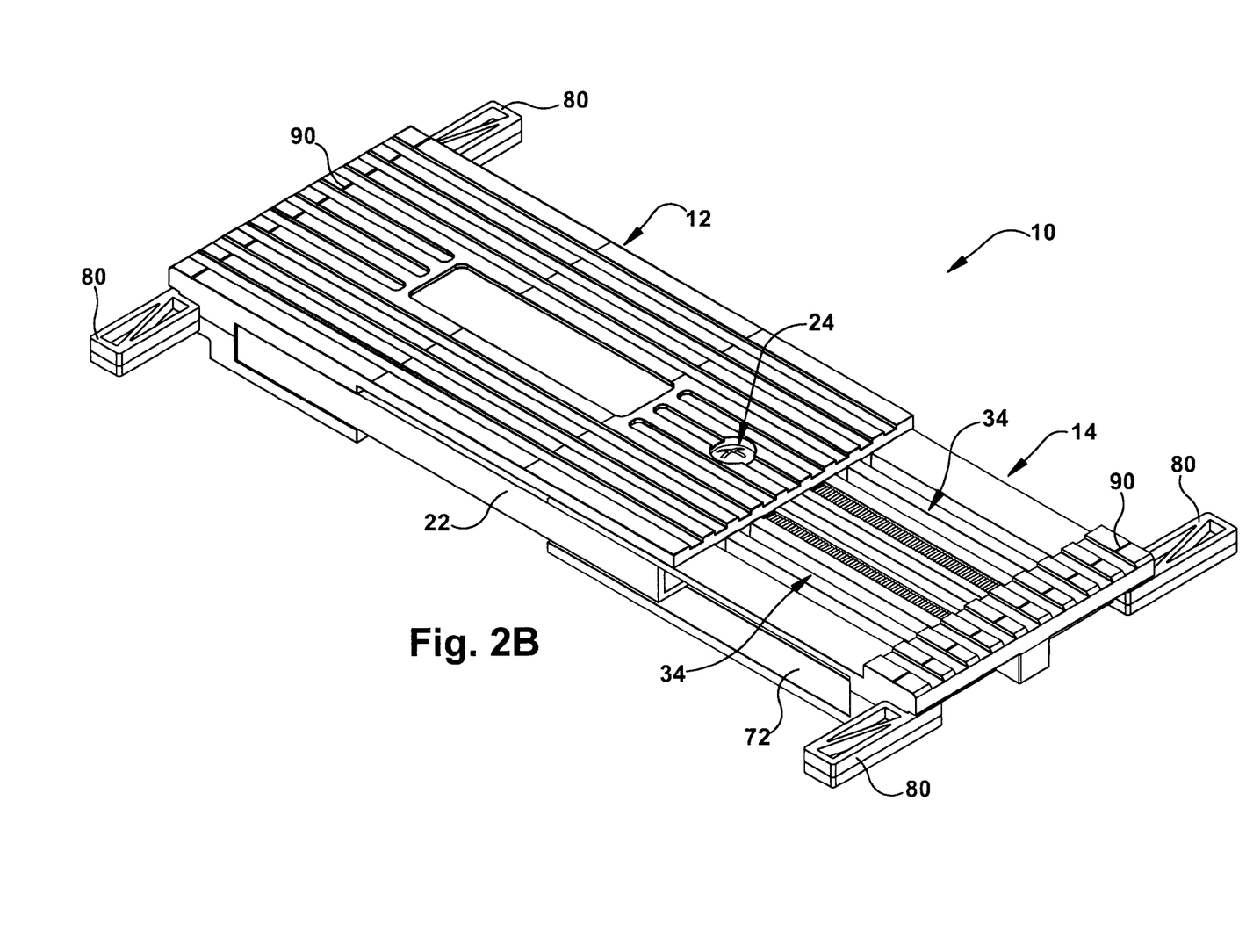
FIG. 2B illustrates an isometric view of the ramp insert of FIG. 2A having extended blocks for connection to a ramp.

With reference to FIGS. 1-2B, a ramp insert 10 is shown. The ramp insert 10 may be capable of being connected to the rails 102 of a ramp 100 by any appropriate means, such as being connected between successive rungs 104 of the ramp 100, for example. The ramp insert 10 may provide a surface between the rungs 104 of the ramp 100. This surface may ease in the loading and unloading of items, such as, motorcycles, dirt bikes, bicycles, mopeds, ATVs, and the like.

The ramp insert 10 may include a first section 12 and a second section 14, as shown in FIGS. 2A-5. The first section 12 may be of any appropriate shape or size, such as of a generally rectangular shape, for example. The second section 14 may be of any appropriate shape or size, such as of a generally rectangular shape, for example. The first section 12 and the second section 14 may be of generally similar shapes and sizes or they may be of different shapes and sizes, and should not be limited to those examples shown and described herein. The first section 12 and the second section 14 may be connected and movable with respect to one another. The overall length of the ramp insert 10 may be changed by moving the first section 12 and/or the second section 14 with respect to one another. To this end, the ramp insert 10 may be used in many types of ramps 100 having various distances between the rails 102.

In an embodiment, the second section 14 may retract into and extend from the first section 12. In such an embodiment, the length of the ramp insert 10 may change depending upon the amount of the second section 14 that may be extended from or inserted into the first section 12. To this end, the ramp insert 10 may have a minimum length where the second section 14 is at a retracted position within, below, or above the first section 12. The ramp insert 10 may have a maximum length where the second section 14 is at an extended position from the first section 12. It may be preferable to have at least a portion of one of the sections 12, 14 overlapping the other section 12, 14 to provide strength to the structure of the ramp insert 10. While shown and described where the second section 14 may retract into or extend out of the first section 12, the present invention should not be limited to such an embodiment, and it is clearly contemplated and will be appreciated that the first section 12 may retract into or extend out of the second section 14.

The first section 12, for example, may have a track portion 30 for slidably moving the first section 12 with respect to the second section 14, as best shown in FIGS. 5-8. In such an embodiment, the second section 14 may have a groove portion 34 for engaging and slidably connecting to the track portion 30, as best shown in FIGS. 2A, 2B, 9 and 10. While shown and described as utilizing a track and groove portion 30, 34, the present invention should not be limited to such an embodiment, and it is clearly contemplated and will be appreciated that the first section 12 and the second section 14 of the ramp insert 10 may engage in any other appropriate manner.

In an embodiment, the track portion 30 may include ribs 32. The ribs 32 may extend from the top surface 20 of the first section 12. The ribs 32 may be of any appropriate shape or size. The ribs 32 may be integrally formed with the first section 12 which along with the geometric shape of the ribs 32 may allow the ribs 32 to transmit the load from the center of the ramp insert 10 to the ends of the ramp 100 and, in turn, to the ground or vehicle in which the ramp 100 may be attached.

In such an embodiment, the groove portion 34 may include grooves 36. The grooves 36 may be of any appropriate shape or size, such as being substantially similar in size and shape to the ribs 32, such that the sections 12, 14 may be extended and/or retracted. As a result, the groove portion 34 may have a similar rib-like structure 38 located between the grooves 36. The ribs 38 of the second portion 14 may be integrally formed with the second portion 14.

The track portion 30 and the groove portion 34 may provide structural support, when the ramp insert 10 is in use, such as standing on, walking on, or loading vehicles, ATVs, etc. As a result of the track portion 30 and the groove portion 34, the load bearing on the ramp may be transferred in a perpendicular direction to the top surface 20 of the ramp insert 10 and may be dispersed or otherwise absorbed by the ramp 100, including the rails 102 and the rungs 104.

As best shown in FIGS. 2A, 3, 5, 8-12 and 16-17, the first section 12 and the second section 14 may include serrated portions 40, 42. The serrated portions 40, 42 may move with respect to each other. In a preferred embodiment, the first section 12 may have a serrated portion 40 that may mate or otherwise engage with the serrated portion 42 of the second section 14. The serrated portions 40, 42 may engage to provide support as the sections 12, 14 may be moved. The serrated portions 40, 42 may also prevent rapid expansion or contraction of the sections 12, 14 to the fully extended and fully retracted positions of the ramp insert 10.

Figure 17:
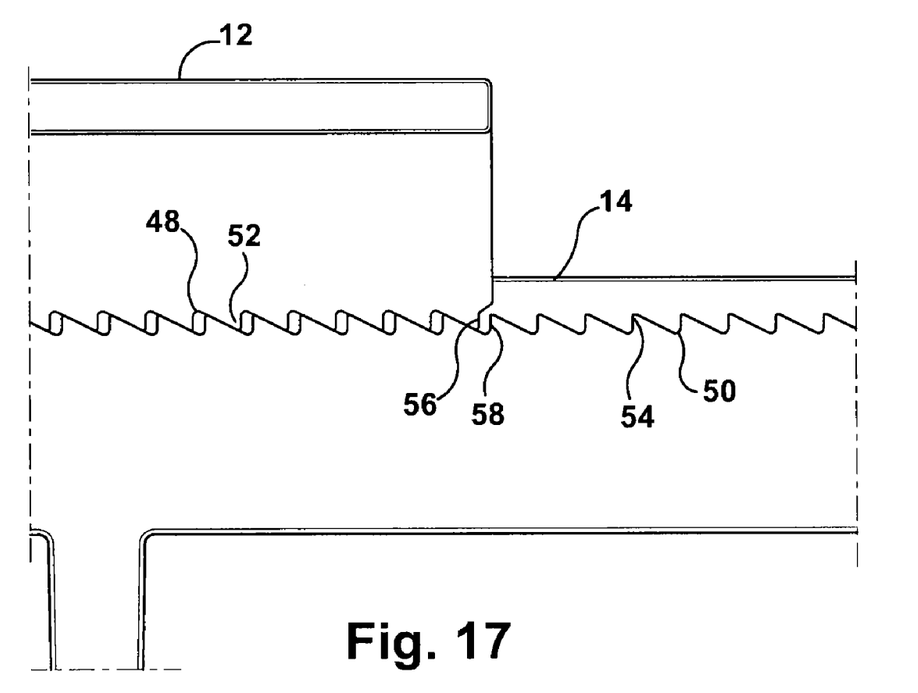
FIG. 17 illustrates a close up side view of the first portion of the ramp insert connected to the second portion of the ramp insert in an embodiment of the present invention.

FIG. 17 illustrates a magnified view of the first and second sections 12, 14 engaging via the serrated portions 40, 42 in an embodiment. The first portion 12 may include an indentation portion 48 and a toothed portion 52. The second portion 14 may include an indentation portion 50 and a toothed portion 54. In such an embodiment, the indentation portion 50 and the toothed portion 54 of the second section 14 may engage the corresponding indentation 48 and tooth portion 52 of the first portion 12. The first section 12 and the second section 14 may also include respective stopping portions 56 and 58. The stopping portions 56, 58 may prevent further movement of the first section 12 and the second section 14 away from each other such as to a position in which the first section 12 may be separated from the second section 14.

The ramp insert 10 may further include a locking mechanism 24. The locking mechanism 24 may secure the first section 12 to the second section 14 to prevent movement and to permit movement of the sections 12, 14 with respect to each other. The locking mechanism 24 may be of any appropriate type of device capable of securing and locking the first section 12 and the second section 14 so that the length of the ramp insert 10 may be maintained. In an embodiment, the locking mechanism 24 may include use of fasteners, such as a screw 26 and a nut 28, for example.

Figure 3:
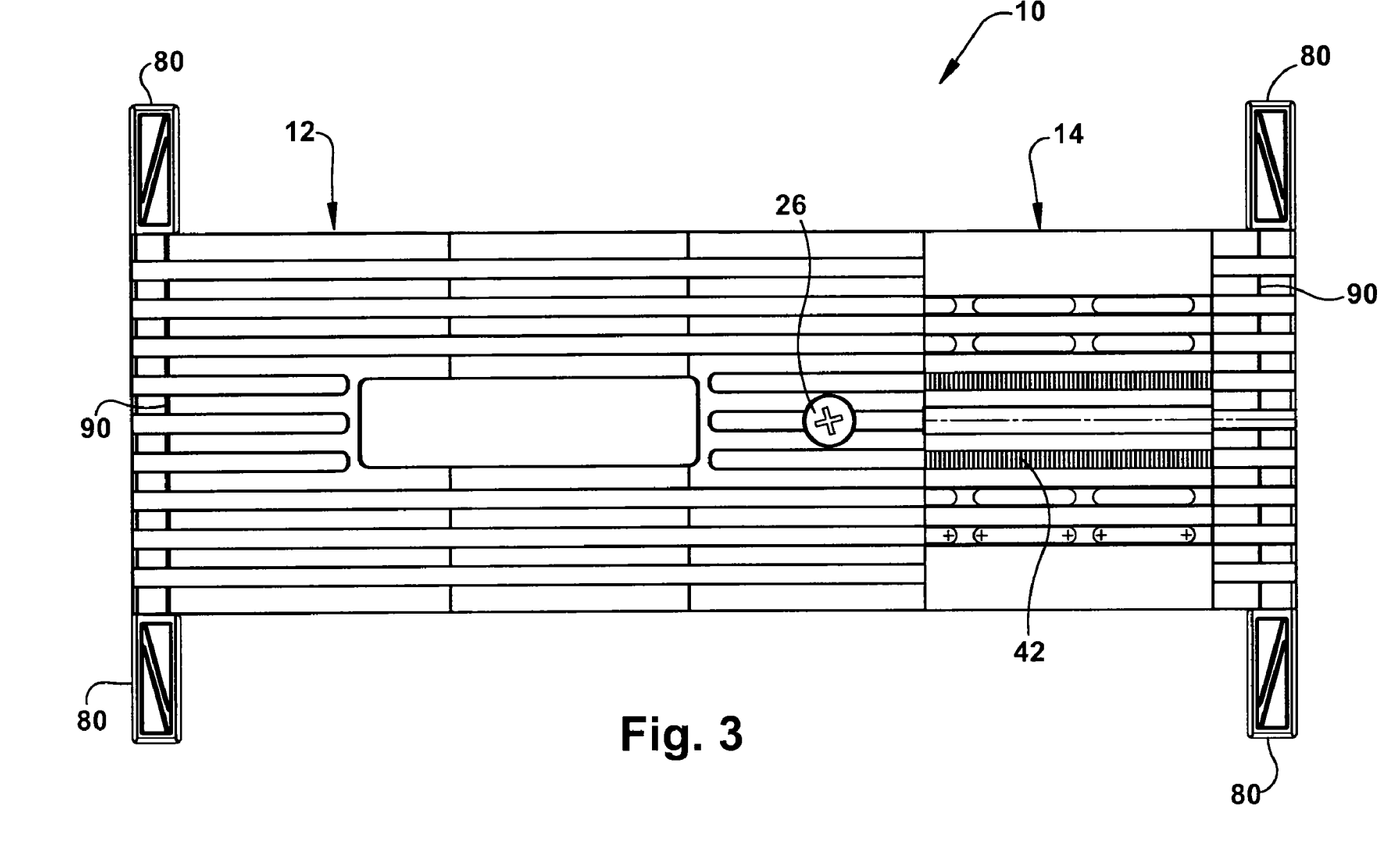
FIG. 3 illustrates a top view of the ramp insert of FIG. 2A.
Figure 4:
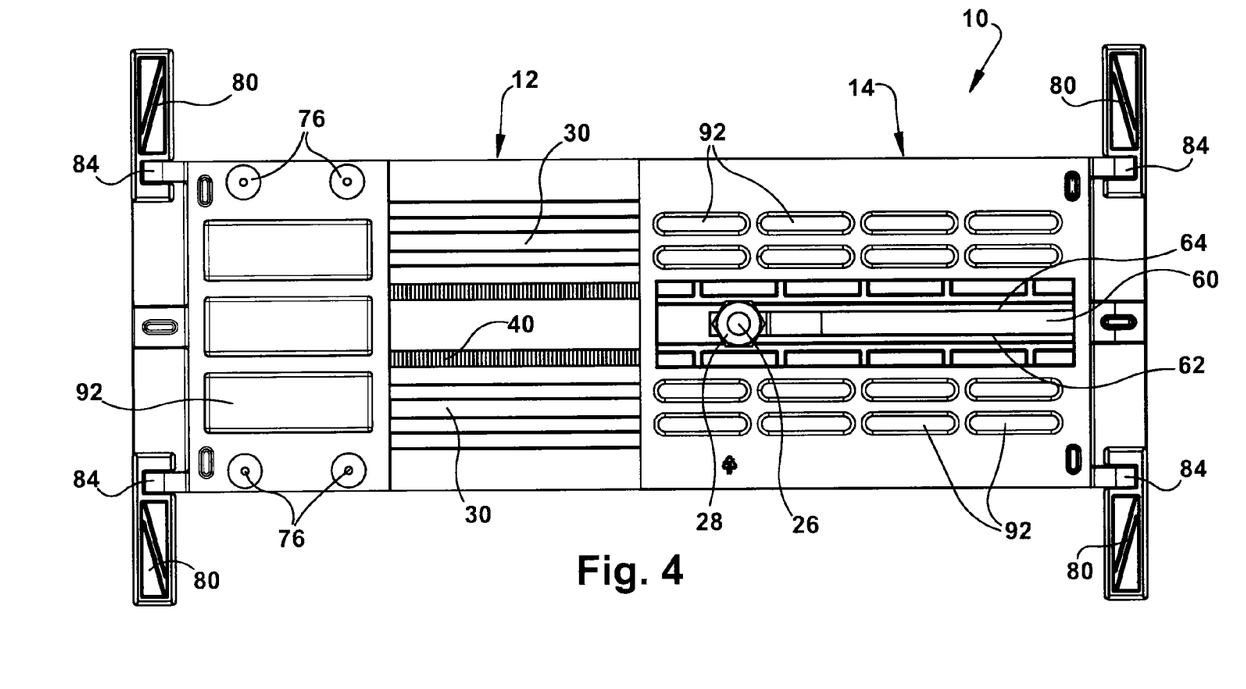
FIG. 4 illustrates a front view of the ramp insert of FIG. 2A.
Figure 5:
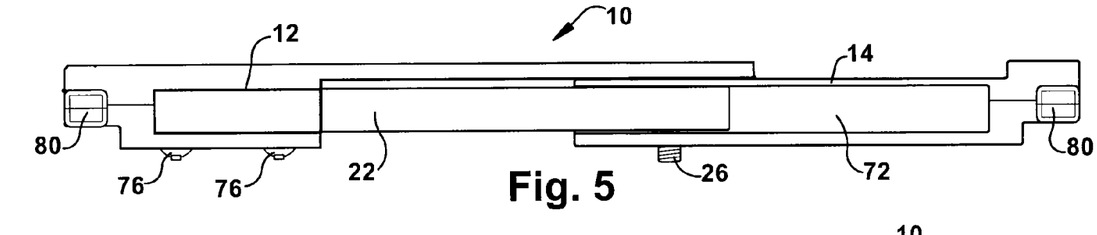
FIG. 5 illustrates a bottom view of the ramp insert of FIG. 2A.
Figure 6:
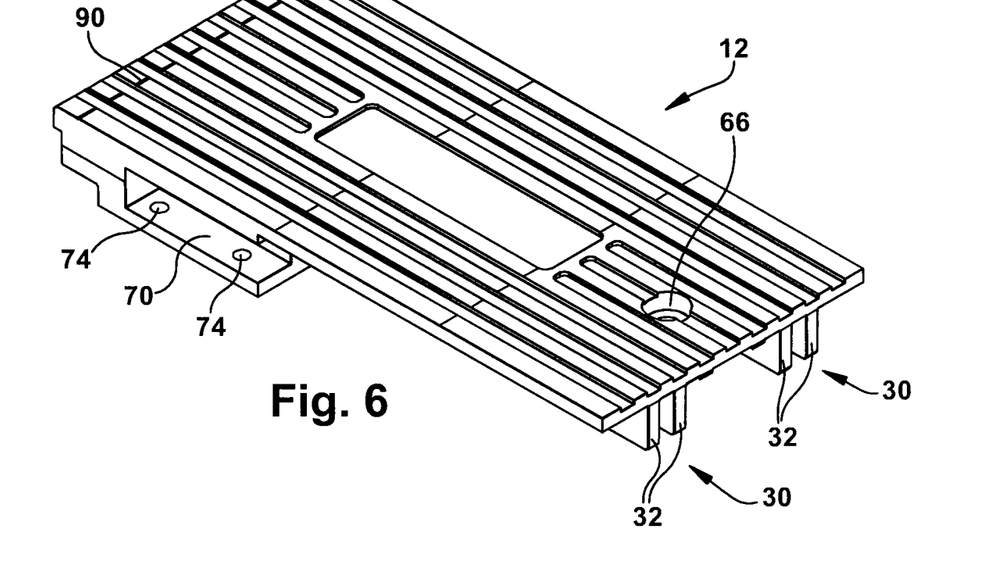
FIG. 6 illustrates an isometric top view of a first portion of a ramp insert in an embodiment of the present invention.
Figure 7:
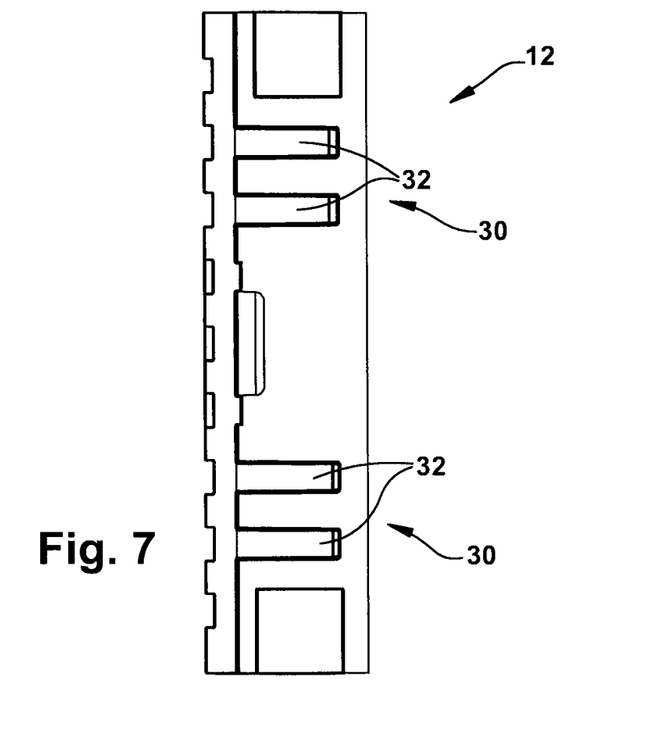
FIG. 7 illustrates a side view of the first portion of the ramp insert of FIG. 6.
Figure 8:
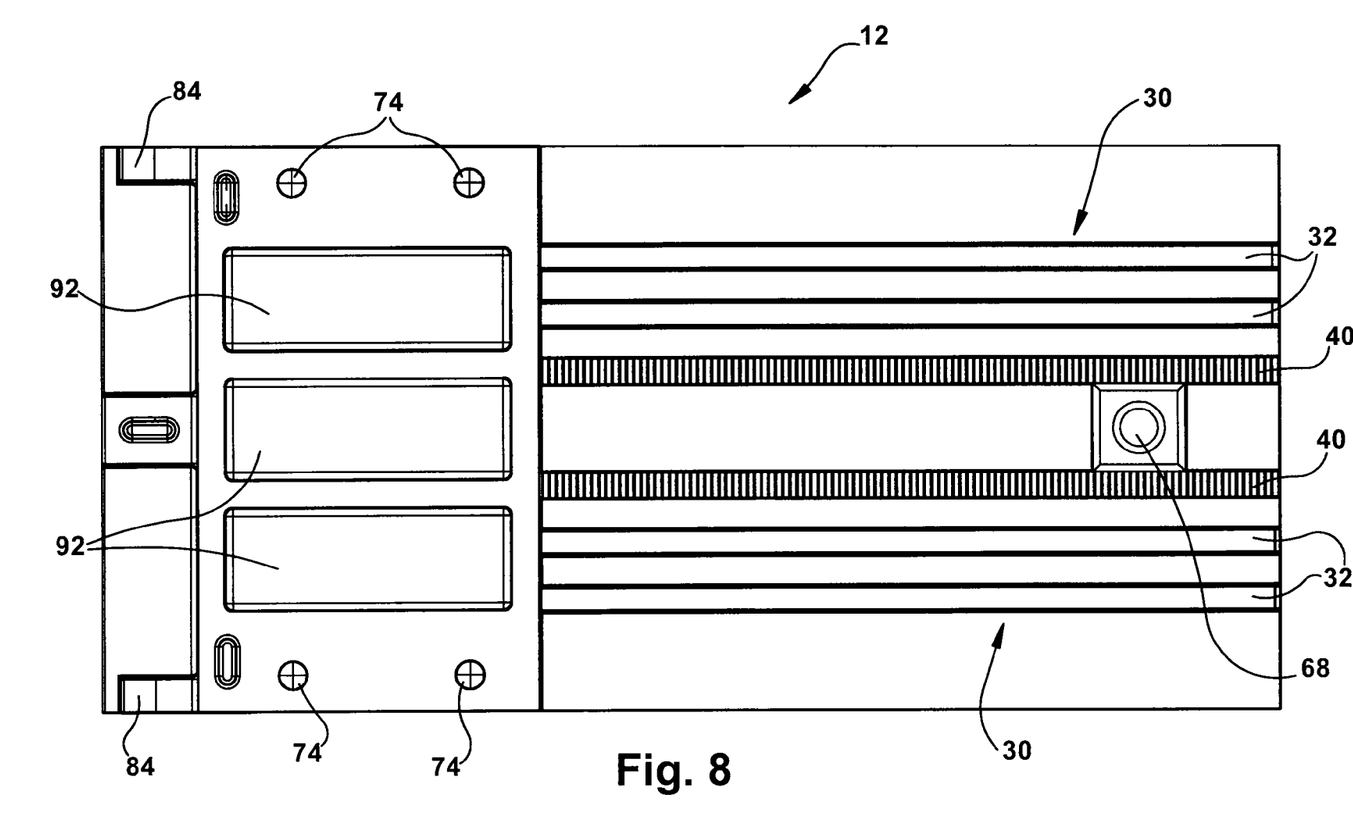
FIG. 8 illustrates a bottom view of the first portion of the ramp insert of FIG. 6.

The screw 26 may be keyed and threaded into the nut 28, as best shown in FIGS. 3-5. The nut 28 may be keyed to the screw 26 such that the nut 28 may not thread out of or otherwise separate from the screw 26. As illustrated in FIG. 6, the first section 12 may also include a recess 66. The recess 66 may be of any appropriate shape or size. The recess 66 may be utilized for insertion and rotation of the screw 26 in one embodiment. The recess 66 may include an aperture 68, as shown in FIG. 8. The aperture 68 may be of any appropriate shape or size. The aperture 68 may have a size and shape substantially similar to the screw 26.

Rotation of the screw 26 in a first direction may permit movement of the first section 12 and/or the second section 14 to change the overall length of the ramp insert 10. At a predetermined length, the screw 26 may be rotated in a second direction, such as the opposite of the first direction, for example, to secure the first section 12 and the second section 14 and thereby prevent relative movement of the first section 12 and the second section 14.

The ramp insert 10 may include a recessed portion 60. The recessed portion 60 may be of any appropriate shape or size. The recessed portion 60 may include a first wall 62 and a second wall 64. The recessed portion 60 may provide access to the locking mechanism 24. The first wall 62 and the second wall 64 may be positioned at a distance from one another that may be substantially similar to the diameter of the nut 28. Accordingly, rotation of the nut 28 may be prevented by contact with the first wall 62 and the second wall 64. To this end, the user may engage and disengage the locking mechanism 24 without holding the nut 28.

The locking mechanism 24 may permit the user to change or adjust the overall length of the ramp insert 10 to correspond to the distance between the rails 102 of a ramp, such as the rails 102 of the ramp 100 shown in FIG. 1, for example. The locking mechanism 24 may permit the ramp insert 10 to be secured into various different types of ramps 100, such as ramps having differently or varyingly spaced rungs 104 and differently or varyingly spaced rails 102. The locking mechanism 24 may also incorporate a security feature (not shown), such as a key lock to prevent removal by unauthorized use.

Figure 9:
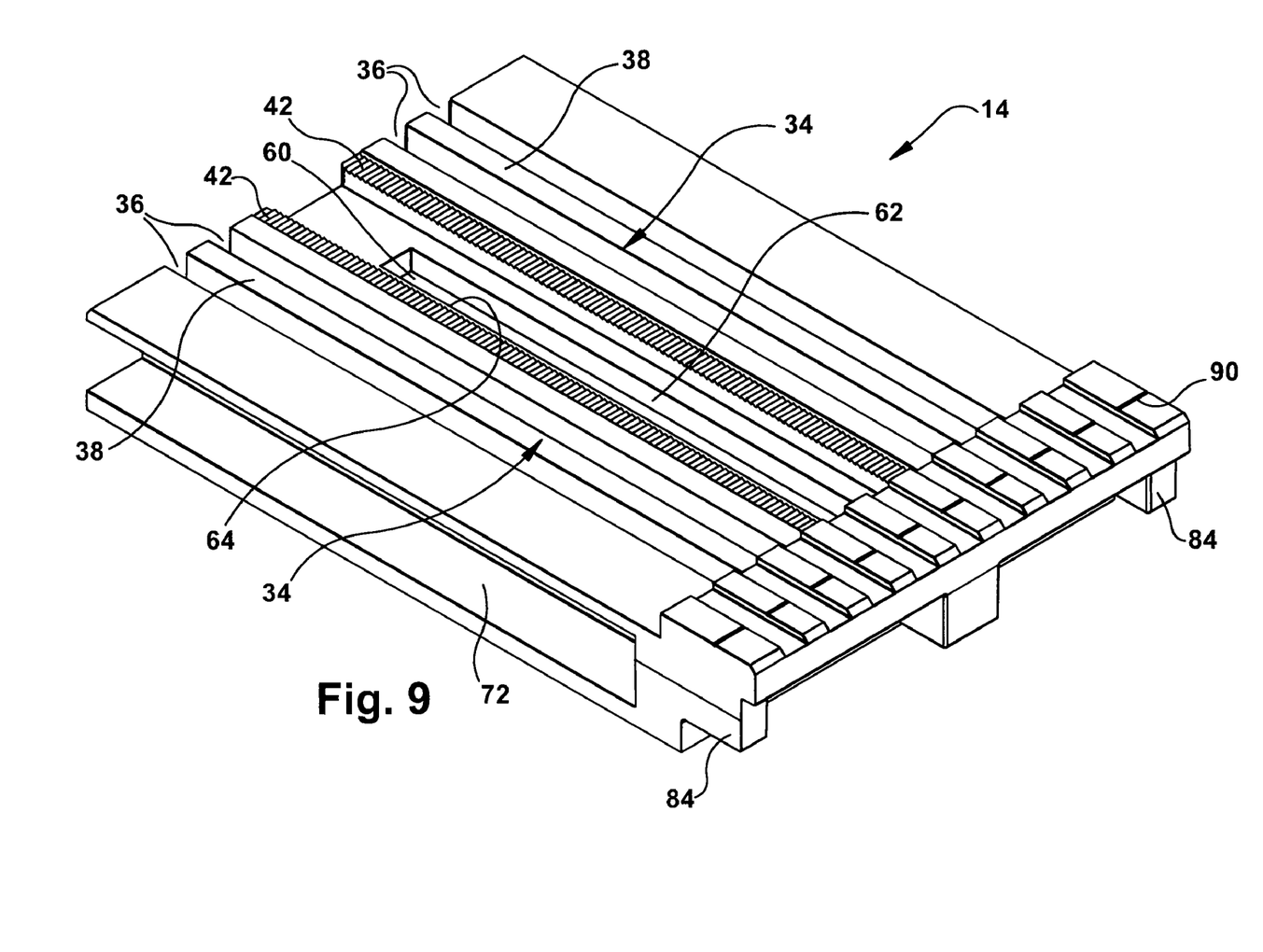
FIG. 9 illustrates an isometric top view of a second portion of a ramp insert in an embodiment of the present invention.
Figure 10:
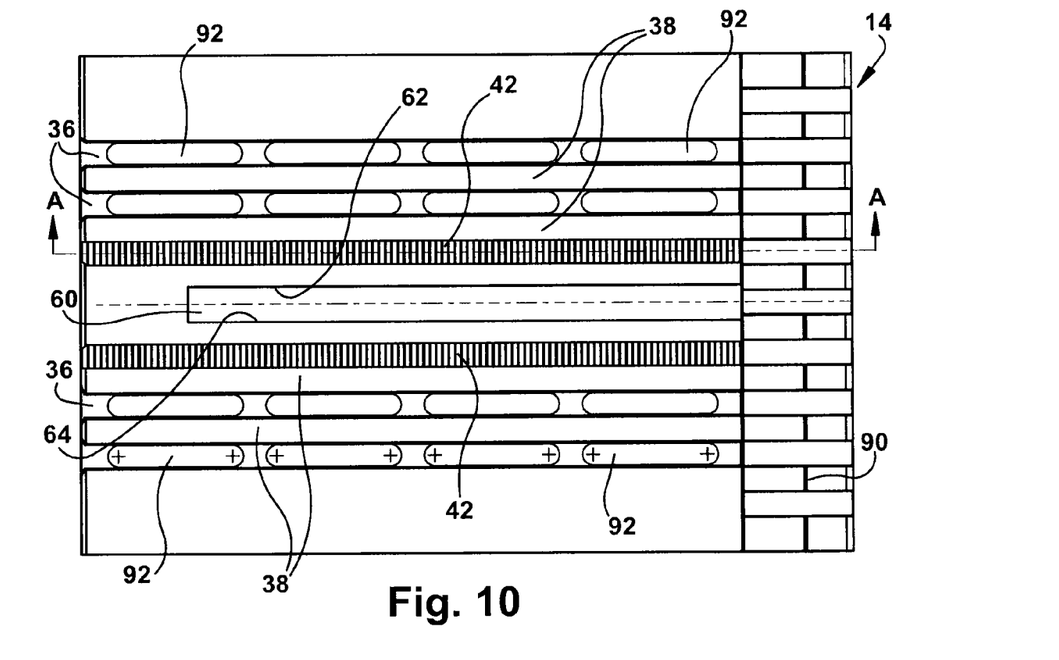
FIG. 10 illustrates a top view of the second portion of the ramp insert of FIG. 9.
Figure 11:
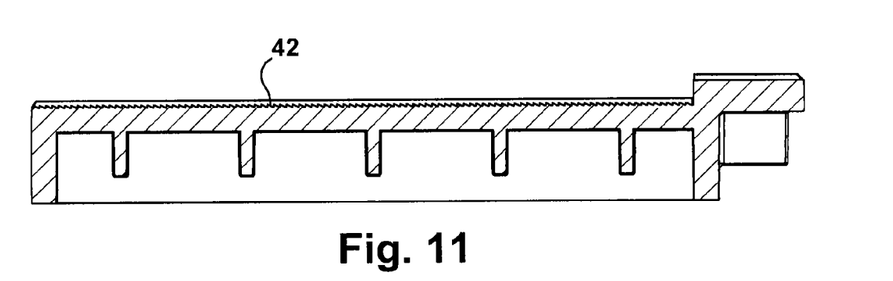
FIG. 11 illustrates a cross-sectional side view of the second portion of the ramp insert taken along line A-A of FIG. 9.
Figure 12:
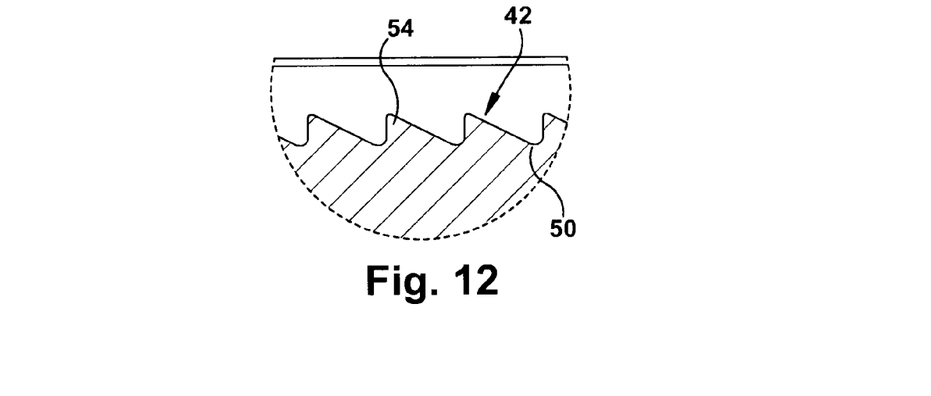
FIG. 12 illustrates a close up view of detail B of FIG. 11.
Figure 13:
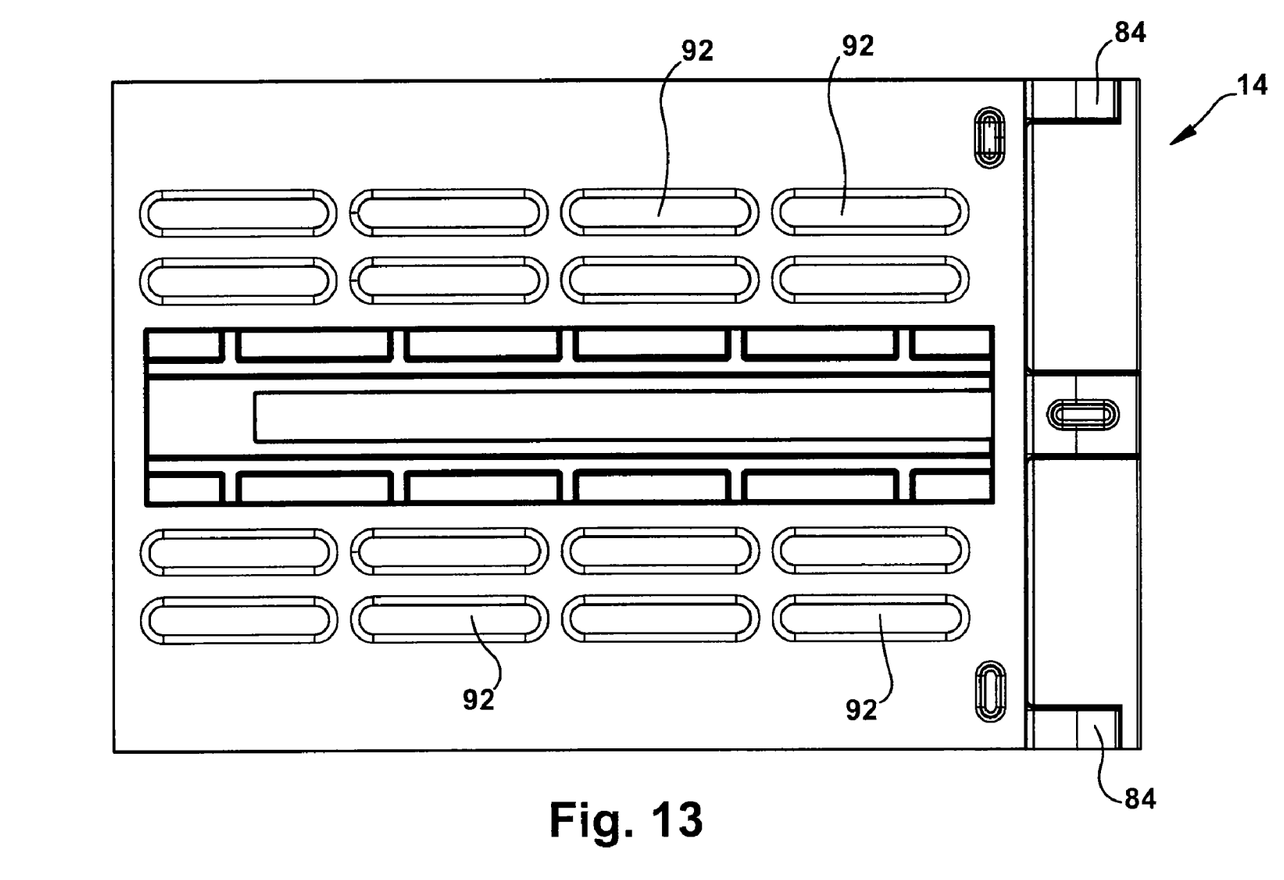
FIG. 13 illustrates a bottom view of the second portion of the ramp insert of FIG. 9.

The first section 12 and the second section 14 may include cutout portions 70, 72, as shown in FIGS. 2B, 6 and 9. The ramp insert 10 may include a support member 22. The ramp insert 10 may include any appropriate number of support members 22. The support members 22 may be of any appropriate shape or size. The cutout portions 70, 72 may be of any appropriate shape or size, such as a recess aligned for insertion of the support member 22, as best shown in FIGS. 2B and 4, for example.

In an embodiment, each side of the ramp insert 10 may include the cutout portions 70, 72 such that there may be two support members 22 in the ramp insert 10. Due to movement of the first section 12 and the second section 14 to create different lengths of the ramp insert 10, support along the length of the ramp insert 10 and between the first section 12 and the second section 14 may improve the strength of the ramp insert 10. The support member 22 may be a tubular member, a solid-bodied member, an I-Beam member, or any other appropriate type of member capable of providing support for the first section 12 and the second section 14.

The support member 22 may be attached to the first section 12 or the second section 14 by any appropriate means, such as being fastened via fasteners, such as screws, rivets, adhesives or the like, fore example. In a preferred embodiment, the support member 22 may be attached to the first section 12 via fasteners 76 through the fastener holes 74, as best shown in FIG. 4. The support member 22 may also engage frictionally on the surfaces of the cutout 72 of the second section 14.

In an embodiment, the support member 22 may be positioned on a distal end 16 and a proximate end 18 of the ramp insert 10. One of ordinary skill in the art will appreciate that the support member 22 may be positioned at any appropriate location on the ramp insert 10 as well as be constructed in numerous other appropriate manners. The present invention should not be deemed as limited to any specific type of support member 22, any number of support members 22, or any location of the support member 22.

Figure 14:
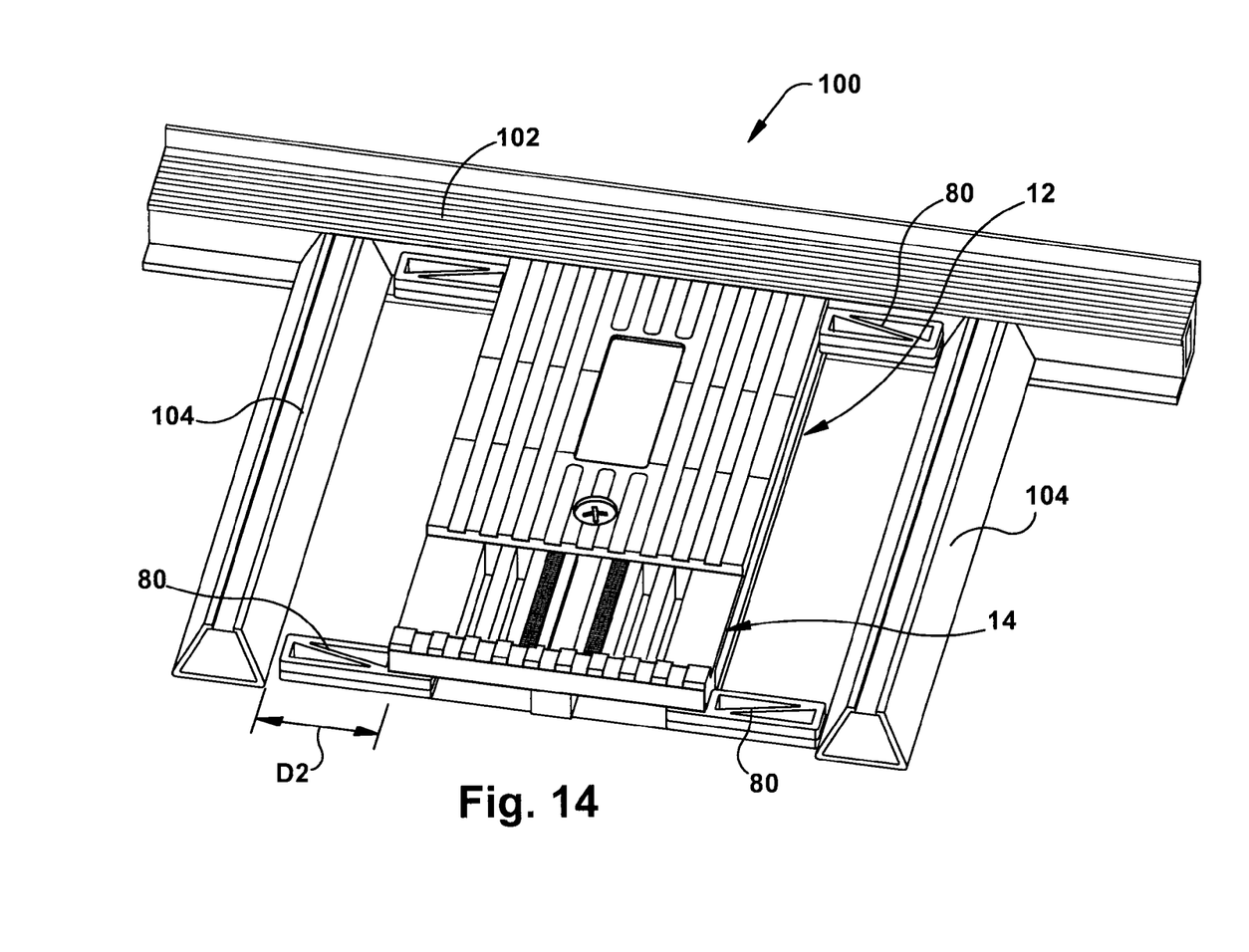
FIG. 14 illustrates the ramp insert of FIG. 2B connected to a portion of a ramp in an embodiment of the present invention.

As shown in FIGS. 2A, 2B, 3, 5, 14, 18 and 19, the ramp insert 10 may include blocks 80. The blocks 80 may be of any appropriate shape or size. In a preferred embodiment, one of the blocks 80 may be attached at each of the four corners of the ramp insert 10. The blocks 80 may frictionally engage or otherwise connect to protrusions 84 of the ramp insert 10, as shown in FIG. 2A. The blocks 80 may be positioned at a first position as shown in FIG. 2A. At the first position, the blocks 80 may protrude or extend a distance D1 from the distal end 16 and the proximate end 18 of the ramp insert 10, as shown in FIG. 2A. The blocks 80 may be positioned at a second position, as shown in FIG. 14. At the second position, the blocks 80 extend or protrude a distance D2 from the proximate end 18 and the distal end 16 of the ramp insert 10. The distance D2 may be greater than the distance D1.

The blocks 80 at the first position or at the second position may be secured to the rails 102 and/or the rungs 104 of the ramp 100, as shown in FIGS. 1 and 14. In an embodiment, the blocks 80 may frictionally engage or otherwise be secured to the rails 102 and/or the rungs 104. To this end, the ramp insert 10 may have a first width (or length) at the first position of the blocks 80 and a second width (at length) at the second position of the blocks 80. The second width may be greater than the first width. In addition, the ramp insert 10 may have a third width where the blocks 80 may be removed from the ramp insert 10. The third width may be less than the first width and the second width. The blocks 80 may be interchangeable with other blocks 80 having different lengths so that the width of the ramp insert 10 can correspond to the open space between the rungs 104 of any type of ramp 100.

To ensure proper installation of the ramp insert 10 on the ramp 100, the ramp insert 10 may include an indicator 90. The ramp insert 10 may include an indicator 90 on the first section 12 and/or the second section 14, as shown in FIGS. 2A-3. The indicator 90 may be a line, marking, a groove, an indentation or any other appropriate type of distinguishing feature located at a predetermined distance from an end of the first section 12 and/or the second section 14. The predetermined distance may be substantially similar to the distance of a recess in the rungs 104 in which the ramp insert 10 may be used. Accordingly, the indicator 90 may be aligned with an edge of the rung 104 when the first section 12 and/or the second section 14 may be sufficiently within the rung 104. Therefore, the indicator 90 may provide the user with confidence that the ramp insert 10 is properly installed.

Figure 18:
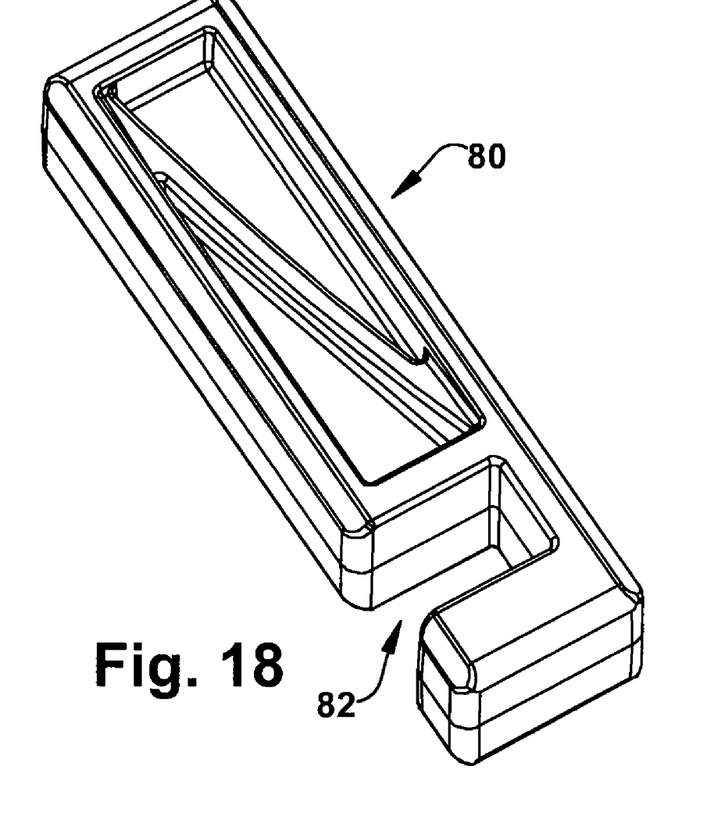
FIG. 18 illustrates an isometric view of a block member that may be used to connect a ramp insert to a rail of a ramp in an embodiment of the present invention.
Figure 19:
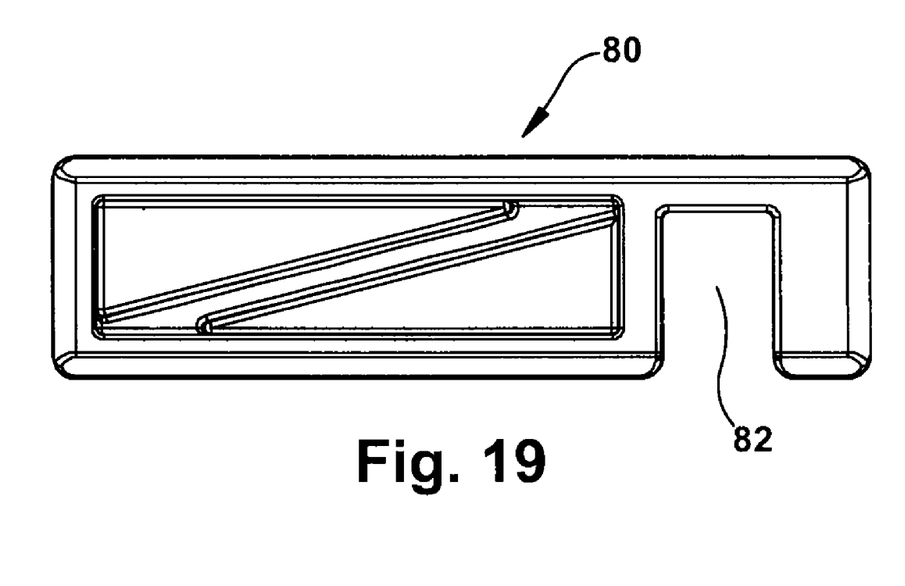
FIG. 19 illustrates a top view of the block member of FIG. 18.

FIGS. 18 and 19 illustrate perspective view of the blocks 80 in an embodiment of the invention. The blocks 80 may include apertures 82. The apertures 82 may be of any appropriate shape or size. The ramp insert 10 may include protrusions 84. The protrusions 84 may be of any appropriate shape or size. The apertures 82 may engage the protrusions 84 of the ramp insert 10, as best shown in FIGS. 2B and 5.

Figure 15:
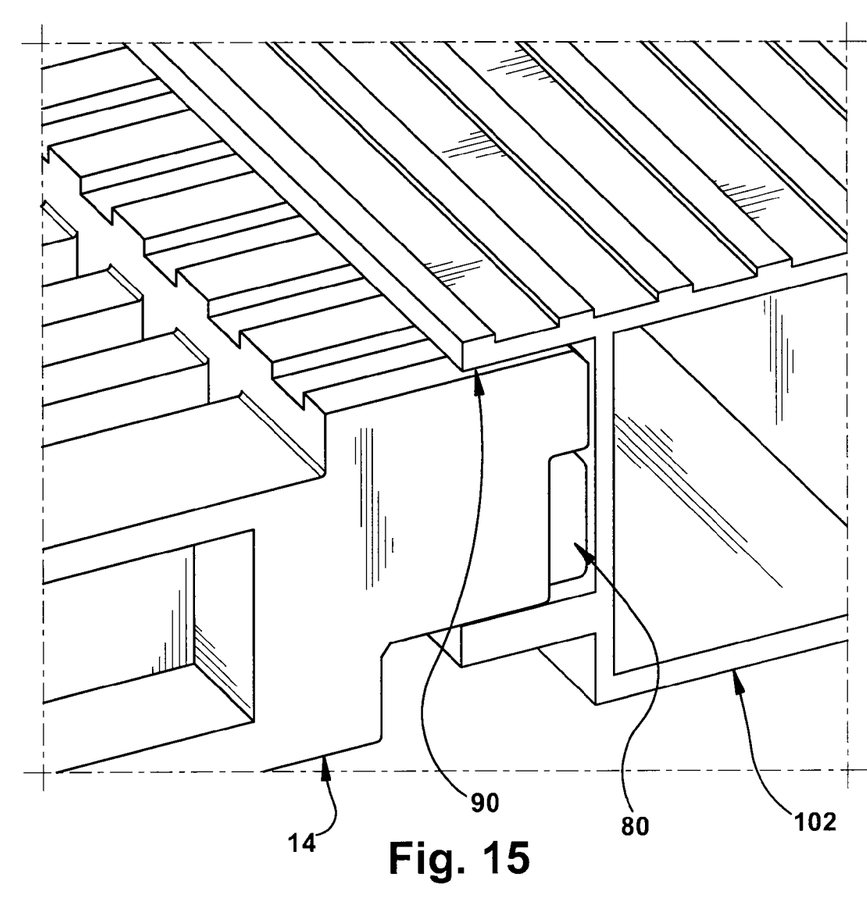
FIG. 15 illustrates close up perspective view of the ramp insert secured to a rail of a ramp in an embodiment of the present invention.
Figure 16:
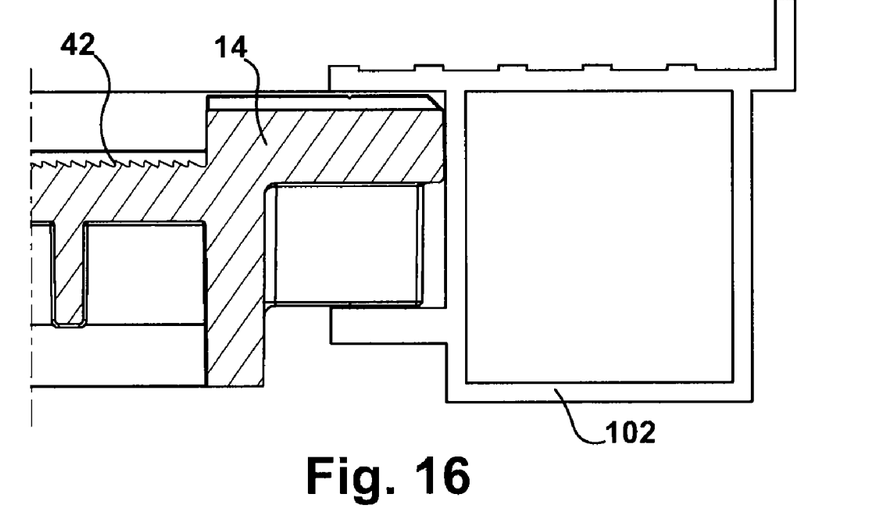
FIG. 16 illustrates a close up side view of the ramp insert secured to a rail of a ramp in an embodiment of the present invention.

In a preferred embodiment, the shape and size of the apertures 82 may be capable of frictionally engaging the protrusions 84 of the ramp insert 10. In a preferred embodiment, the blocks 80 may be separable from the ramp insert 10. In use, the blocks 80 may be engaged on opposing sides by the rails 102, the ramp insert 10 and/or the rungs 104. For example, FIG. 15 illustrates the blocks 80 at the first position and maintained between the rails 102 and the second section 14 of the ramp insert 10. Although the blocks 80 may be shown as being separable from the ramp insert 10, one of ordinary skill in the art will appreciate that the blocks 80 may be temporarily or permanently affixed to the ramp insert 10, such as by connection to the protrusions 84.

The ramp insert 10 may be made of any appropriate type of material as will be appreciated by one of ordinary skill in the art. In an embodiment, the ramp insert 10 may be manufactured from polypropylene plastic, or other suitable thermoplastic material such as by injection molding, for example. In such an embodiment, the ramp insert 10 may include impressions 92, as best shown in FIGS. 5, 8, 10 and 13. The impressions 92 may reduce the amount of material needed to manufacture the ramp insert 10 and to assist in removing the ramp insert 10 from a mold. The impressions 92 may be of any appropriate shape, size or type, such as, grooves, indentations, openings and/or apertures, for example. The impressions 92 may also aid in dispersing the load on the ramp insert 10 and provide structural support.

In use, the ramp insert 10 may provide a structurally supportive surface at least partially filling an opening between successive rungs 104 of a ramp 100. As shown in FIGS. 1 and 14, the ramp insert 10 may be positioned between the rungs 104 of the ramp 100. The blocks 80 may be removed, moved to the first position or moved to the second position so that the ramp insert 10 has a width corresponding to the width of the ramp 100. In FIGS. 1 and 14, for example, the blocks 80 may be pivoted or otherwise moved to the second position. The ramp insert 10 may be inserted into one of the rails 102. The locking mechanism 24 may be unlocked, loosened, or otherwise disengaged from securement with the first section 12 and the second section 14.

The width of the ramp insert 10 may be adjusted by moving the first section 12 and/or the second section 14. When the width of the ramp insert 10 is extended to the distance between the rails 102 and positioned on or in the rails 102 and/or the rungs 104, the locking mechanism 24 may lock the first section 12 and the second section 14 and secure the ramp insert 10 to the ramp 100. Before locking the first section 12 to the second section 14, the user may ensure that the first section 12 and the second section 14 are sufficiently within the rails 102 (or the rungs 104) by ensuring that the indicator 90 is adjacent to, aligned with, or within the edges of the rails 102.

As a result, the ramp insert 10 may fill the gap between the successive rungs 104 of the ramp 100 for walking, standing and moving a vehicle or other object along the ramp 100. The description in this and the preceding paragraphs should not be deemed as limited to a required order for securing the ramp insert 10 to the ramp 100. The preceding steps to securing the ramp insert 10 may be accomplished in various orders within the spirit of the present invention.

The invention has been described with reference to the preferred embodiment. Obviously, modifications and alternations will occur to others upon a reading and understanding of this specification. The claim as follows is intended to include all modifications and alterations insofar as they come within the scope of the claim or an equivalent thereof.

Having thus described the invention, the following is claimed:

1. A ramp insert for insertion between rails of a ramp, wherein said rails are a certain width apart, said ramp insert comprising:
    a body having an adjustable length, said body comprising:
        a first section including a track portion;
        a second section including a groove portion that is capable of fitting together with said track portion; and
        wherein one of said first or second sections is capable of slidably moving with respect to said other section via said track portion and said groove portion;
    wherein said body is placed between the rails of the ramp; and
    wherein said length of said ramp insert is capable of being adjusted by moving said first section or said second section to adjust to various widths of ramps.

2. The ramp insert of claim 1, further including a locking mechanism.

3. The ramp insert of claim 2, wherein said locking mechanism includes a screw and a nut.

4. The ramp insert of claim 3, wherein rotation of said screw in a first direction permits movement of said first section or said second section to change the overall length of said ramp insert.

5. The ramp insert of claim 4, wherein rotation of said screw in a second direction, such as the opposite of said first direction, to secure said first section and said second section and thereby prevent relative movement of said first section and said second section.

6. The ramp insert of claim 1, wherein said track portion includes ribs.

7. The ramp insert of claim 1, wherein said groove portion includes grooves.

8. The ramp insert of claim 1, wherein said sections may be extended or retracted via said track portion and said groove portion.

9. The ramp insert of claim 8, wherein said groove portion includes a rib-like structure located between said grooves.

10. The ramp insert of claim 6, wherein said ribs transmit a load from a center of said ramp insert to ends of the ramp and to the ground or vehicle in which the ramp is attached.

11. The ramp insert of claim 1, further including at least one block.

12. The ramp insert of claim 11, wherein said at least one block is capable of engagement on opposing sides by the rails, said ramp insert or the rungs.

13. The ramp insert of claim 1, wherein said first section includes a serrated portion.

14. The ramp insert of claim 13, wherein said second section includes a serrated portion.

15. The ramp insert of claim 14, wherein said serrated portion of said first section is capable of engagement with said serrated portion of said second section.

16. The ramp insert of claim 1, wherein said ramp insert is further placed between rungs of the ramp.

17. The ramp insert of claim 1, wherein the location of said blocks may be adjusted whereby said ramp insert has a length corresponding to the width of the ramp.

18. The ramp insert of claim 17, wherein said length of said ramp insert is extended to a distance between the rails and positioned on the rails, wherein said locking mechanism secures said first section and said second section together thereby securing said ramp insert to the ramp.

* * * * *